May 20, 1958 R. V. MUFFLEY 2,835,743

MAGNETIC TRANSDUCER ASSEMBLY

Filed March 22, 1956

INVENTOR.
ROBERT V. MUFFLEY

BY John B. Clark

ATTORNEY

United States Patent Office 2,835,743

Patented May 20, 1958

2,835,743

MAGNETIC TRANSDUCER ASSEMBLY

Robert V. Muffley, Los Altos, Calif., assignor to International Business Machines Corporation, New York, N. Y., a corporation of New York Application March 22, 1956, Serial No. 573,300

4 Claims. (Cl. 179—100.2)

The present invention relates generally to transducers and more particularly to multichannel, magnetic transducers for use in connection with multichannel, magnetic storage devices.

When magnetic storage tracks are to be made available at random, an obvious solution is to utilize one transducer per track and to merely switch, either electronically or mechanically, to the desired transducer. However, when the number of such tracks becomes very large, the high cost of existing transducers renders this solution prohibitive. The present invention is directed to a relatively low-cost magnetic transducer assembly fabricated in an array suited for use in connection with the desired recording media, e. g., tapes, discs or drums.

Thus, it is one object of the present invention to provide an improved multichannel transducer assembly.

Another object is to provide a less expensive multichannel, magnetic transducer assembly which provides ready reference to selected channels.

A feature of this invention is the provision of a multichannel transducer assembly which includes a conductor linked by several magnetic cores, together with the provision of a unique switching arrangement, to form several magnetic transducers selectively operated under the control of the switching arrangement for coacting with selected tracks of the recording medium.

Accordingly, it is another object of this invention to provide an array of transducers having a common energizing means, together with means for selecting the transducer affected by the energizing means.

A further object is to provide a transducer array having a common winding linked by several transducer cores and a switching arrangement for selecting portions of the winding corresponding to predetermined cores for coaction with selected paths of a recording medium.

Still another object is to provide a multichannel transducer assembly utilizing a single winding linked by several transducer cores, together with a switching arrangement for connecting the winding across selected cores for rendering cores associated with selected channels of a recording medium effective.

Other objects of the invention will be pointed out in the following description and claims and illustrated in the accompanying drawings which disclose, by way of example, the principle of the invention and the best mode which has been contemplated by applying that principle.

Figure 1:
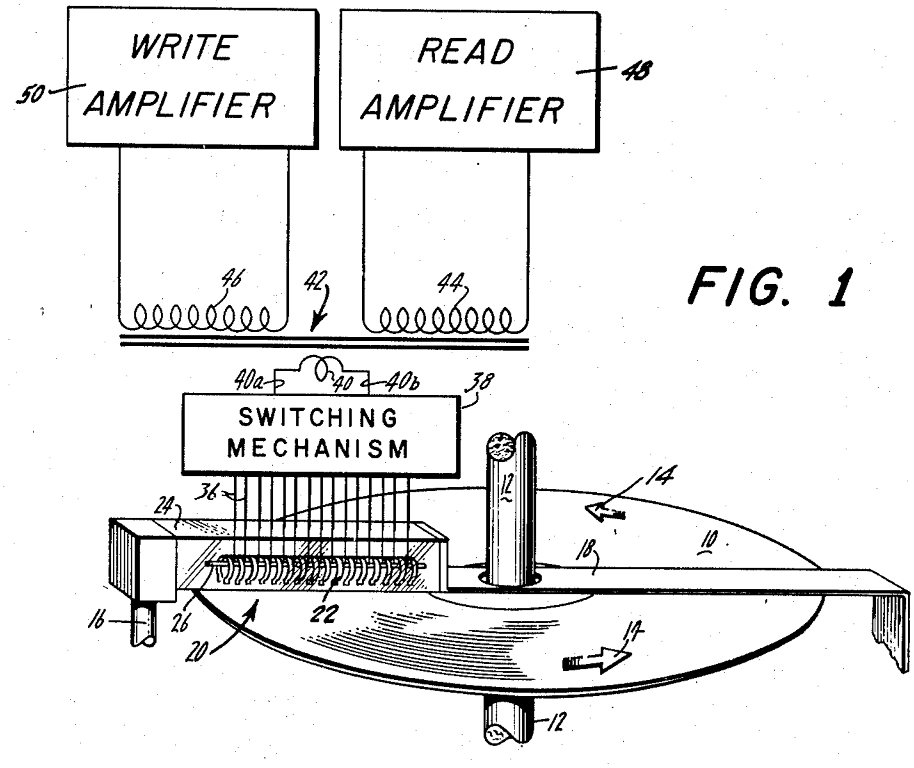
Fig. 1 is a partial, perspective view of the novel transducer assembly and an associated recording medium.

Referring now to Fig. 1, a magnetic disc 10 is secured to a shaft 12 which is journalled in suitable bearings (not shown) for rotation as is indicated by arrows 14. Supported adjacent to and radially of the upper surface of the disc 10, as by arms 16 and 18, is a transducer assembly 20 which includes a plurality of transducers

22 adapted to cooperate with corresponding magnetic storage tracks of the disc arranged concentric thereto. The transducer assembly 20 may assume any one of many configurations to better suit it to the particular recording medium with which it is to be used, and it is not intended to limit the scope of the present invention to the form of assembly disclosed in the drawings.

Figure 2:
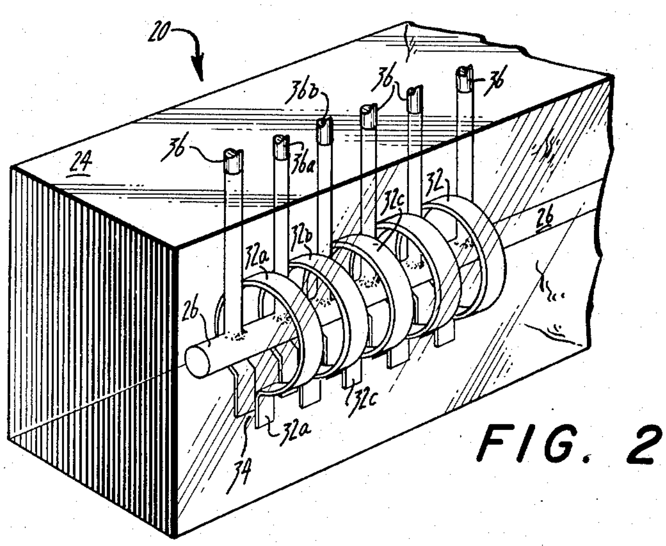
Fig. 2 is an enlarged and expanded perspective view of a portion of the transducer assembly shown in Fig. 1.

The transducer assembly 20 (Fig. 2) is shown imbedded in an insulating plastic sheath 24 and generally comprises a conductor 26 supported in the plastic which is affixed to the arms 16 and 18, the conductor 26 being arranged, therefore, to extend radially of the disc adjacent the surface thereof. A plurality of magnetic cores 32, having suitable magnetic gaps 34 therein, are mounted on the conductor 26 along the length thereof and are positioned opposite each of the storage tracks of the disc 10 to be utilized in connection with the assembly 20.

A plurality of wires 36 are electrically affixed to the conductor 26 adjacent corresponding cores 32 so that each core has a wire 36 on either side thereof, i. e., wire *36a* is connected to the conductor 26 intermediately of cores *32a* and *32b*, wire *36b* being connected to conductor 26 between cores *32b* and *32c*, etc. Successive pairs of wires 36, e. g., *36a* and *36b*, *36b* and *36c*, together with the portions of the conductor 26 connected therebetween, each define a coil which is associated with a different core 32. Each of the wires 36 is brought via printed circuitry or other appropriate means to a suitable switching mechanism 38 (Fig. 1) arranged to connect selected pairs of wires 36 across a winding 40 of a transformer 42, the other windings 44 and 46 of which are connected to read and write amplifiers 48 and 50, respectively.

To record data on or to read data from selected tracks, the switching mechanism 38 is arranged to connect the winding 40 of the transformer 42 to the wires 36 which are connected to the conductor 26 across the core 32 associated with the selected track. In this way that portion of the conductor 26 which extends through the core 32 corresponding to the selected track is connected across the winding 40 of the transformer 42. Thus, for example, when it is desired to record data on the track associated with the core *32b*, the switching mechanism connects the winding 40 across the core *32b*, i. e., connects lines *40a* and *40b* of the winding 40 to wires *36a* and *36b*, respectively, and the winding 46 is energized according to the data to be recorded. The current induced in the winding comprising wires *36a*, *36b* and the conductor 26 produces corresponding variations in the magnetic flux across the gap 34 of the core *32b*, which variations are recorded on the proper track. Similarly, to read data from this track, the above mentioned connections are made and the read signal is taken from the winding 44 of the transformer 42, the flux in the core *32b* generated by data recorded on the track inducing a corresponding current to flow through the winding 40.

It will now be understood that, if it is desired to record the same data on several adjacent tracks, it is necessary only to connect the wires 36 lying on either side of these tracks across the winding 40. By means of the present invention, therefore, a transducer array utilizing a winding common to several cores is operable to cooperate magnetically with one or more selected tracks of the associated recording medium, thereby providing an inexpensive multi-transducer construction well suited to random access applications and having an access time to selected tracks limited only by switching time.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A magnetic transducing apparatus adapted to coact with a magnetic record member having a plurality of spaced recording tracks, said apparatus comprising a plurality of core members, each of which is disposable adjacent a different one of said tracks, winding means comprising a main conductor disposed to extend through each of said core members, and a plurality of auxiliary conductors connected to said main conductor at points intermediate of said core members to cause successive pairs of said auxiliary conductors together with the respective portions of said main conductor connected therebetween to define a plurality of coils each of which is linked with a different one of said core members, first and second terminals, and switch means operable to selectively connect any two of said conductors respectively to said terminals to effect operation of each core member linked by the portion of said main conductor interconnecting said two selected auxiliary conductors.

2. A magnetic transducing apparatus positionable adjacent a magnetizable recording surface having a plurality of recording tracks, said apparatus comprising a plurality of core members, means for mounting said core members on an axis parallel to said surface and transverse to said tracks, winding means operable to selectively render one or more adjacent said core members effective simultaneously, said winding means comprising a main conductor extending through each of said core members parallel to said axis, and a plurality of auxiliary conductors connected to said main conductor at points intermediate of said core members to cause successive pairs of said auxiliary conductors together with respective portions of said main conductor connected therebetween to define a plurality of coils each of which is associated with a different one of said core members, first and second terminals, and switch means operable to selectively connect any two of said auxiliary conductors respectively to said first and second terminals to effect operation of each core member linked by the portion of said main conductor interconnecting said two said selected auxiliary conductors.

3. A magnetic transducing apparatus positionable adjacent a magnetic surface having a plurality of separate recording tracks and operable in response to a signal applied to a pair of input terminals to effect a recording operation selectively on any one or more adjacent said tracks, said apparatus comprising a plurality of separate core members, means for mounting said core members on an axis parallel to said surface and transverse to said tracks, winding means comprising a main conductor disposed parallel to said axis and extending through each of said core members, and a plurality of auxiliary conductors connected to said main conductor at points intermediate of said core members to cause successive pairs of said auxiliary conductors together with the respective portions of said main conductor connected therebetween to define a plurality of coils each of which is linked with a different one of said core members, and switch means for selectively connecting any two of said auxiliary conductors respectively to said terminals to cause each core member linked by the portion of the main conductor connected therebetween to magnetize each said recording track associated therewith in accordance with signals applied to said input terminals.

4. A magnetic transducing apparatus positionable adjacent a magnetized surface having a plurality of separate recording tracks and operable to provide a signal to a pair of output terminals selectively in accordance with the magnetization of one or more adjacent said tracks, said apparatus comprising a plurality of separate core members each of which is mounted in flux transmitting relationship with a different one of said tracks, winding means comprising a main conductor extending through each of said core members and a plurality of auxiliary conductors connected to said main conductor at points intermediate of said core members to cause successive pairs of said auxiliary conductors together with the respective portions of said main conductor connected therebetween to define a plurality of coils each of which is linked with a different one of said core members, and switch means for selectively connecting any two of said auxiliary conductors respectively to said output terminals to cause each core member linked by the current path formed by said two selected conductors and the portion of said main conductor connected therebetween to induce a current in said path in accordance with the magnetization of its associated recording track.

References Cited in the file of this patent

UNITED STATES PATENTS

| | | |
|---|---|---|
| 2,511,121 | Murphy | June 13, 1950 |
| 2,531,642 | Potter | Nov. 28, 1950 |
| 2,611,025 | Jankowski | Sept. 16, 1952 |
| 2,611,813 | Sharpless et al. | Sept. 23, 1952 |
| 2,673,248 | Hamburg | Mar. 23, 1954 |